United States Patent

Kawakami et al.

[11] 4,338,367
[45] Jul. 6, 1982

[54] MAGNETIC RECORDING TAPE

[75] Inventors: Yoshio Kawakami; Yoneo Matsuzawa; Norifumi Kajimoto, all of Tokyo, Japan

[73] Assignee: TDK Electronics Co., Ltd., Tokyo, Japan

[21] Appl. No.: 186,848

[22] Filed: Sep. 15, 1980

[30] Foreign Application Priority Data

Oct. 2, 1979 [JP] Japan ............................ 54-126358

[51] Int. Cl.$^3$ .............................................. G11B 5/70
[52] U.S. Cl. .................................... 428/141; 360/134; 428/336; 428/339; 428/409; 428/694; 428/900
[58] Field of Search ............... 428/900, 910, 480, 147, 428/143, 409, 336, 148, 149, 150, 483, 323, 327, 328, 329, 331, 339, 141, 694, 695; 427/128, 129, 127

[56] References Cited

U.S. PATENT DOCUMENTS

| | | | |
|---|---|---|---|
| 3,821,156 | 6/1974 | Farrar | 260/40 R |
| 3,958,064 | 5/1976 | Brekken et al. | 428/900 |
| 3,967,025 | 6/1976 | Tanak et al. | 428/480 |
| 3,983,285 | 9/1976 | Riboulet et al. | 428/480 |
| 4,071,654 | 1/1978 | Ogawa et al. | 428/336 |
| 4,097,650 | 6/1978 | Shirakata et al. | 428/337 |
| 4,112,187 | 9/1978 | Asakura et al. | 427/128 |
| 4,135,031 | 1/1979 | Akurki et al. | 427/129 |
| 4,163,823 | 8/1979 | Legras et al. | 427/128 |
| 4,233,352 | 11/1980 | Oro et al. | 428/900 |

FOREIGN PATENT DOCUMENTS 2807147  9/1978  Fed. Rep. of Germany ...... 428/409

*Primary Examiner*—Stanley S. Silverman
*Attorney, Agent, or Firm*—Oblon, Fisher, Spivak, McClelland & Maier

[57] ABSTRACT

A magnetic recording tape comprises a polyethyleneterephthalate base film coated with a magnetic layer which has an index H given by the equation:

$$1.5 > 19.00 - 0.406\, d_B - 0.016\, H - 0.553\, d_T$$
$$d_T \leq 18(\mu m)$$

wherein the reference $d_T(\mu m)$ designates a total thickness of the magnetic recording tape; $d_B(\mu m)$ designates a thickness of the base film and H designates a sum of numbers of interference rings ($H_1$, $H_2$, $H_3$ . . . )per 1 mm$^2$.

5 Claims, No Drawings

MAGNETIC RECORDING TAPE

BACKGROUND OF THE INVENTION

1. Field of the Invention

The present invention pertains to a magnetic recording tape. More particularly, it relates to an extremely thin magnetic recording tape.

2. Description of the Prior Art

In order to provide long recording times, a magnetic tape is made thin and packed in a supply reel. Thus, the total length of the magnetic recording tape to be packed in a supply reel can be made longer in proportion to the diminishing thickness of said tape. This provides for longer recording times. In order to make the total thickness of the magnetic tape thin, it is necessary to make the base film thin, or to make the magnetic layer coated on the surface of the said base film thin, or to make both thin. Any of the dimensions are too thin, the stiffness of the magnetic tape is decreased, and on the occasion of loading or unloading of the said tape onto the rotating head drum the peripheral portion of the magnetic recording tape would be injured because of contact with the edge of the guide arm. In the worst case, the tape could be totally broken. Such injury of the peripheral portion of the tape could be, in the case of a video tape where control signals and audio signals are recorded on the peripheral portion of the magnetic tape, a cause of such false actions as output fluctuations or decreased reproduction signals, or faulty syncronism of the video signal. Accordingly, there has been a limit to the total thickness of the conventional magnetic recording tape. For conventional magnetic recording tapes which comprise a polyethyleneterephthalate base film and are coated with a magnetic layer of a plastic binder and a magnetic powder, normally a powered metal or metal oxide, the total thickness was limited more or less to 20 $\mu$m.

SUMMARY OF THE INVENTION

It is an object of the present invention to provide an extremely thin magnetic recording tape whose magnetic recording reproduction characteristics at the peripheral portions are not diminished.

The foregoing and other objects of the present invention have been attained by providing a magnetic recording tape comprising a polyethyleneterephthalate base film coated with a magnetic layer which has an index H given by the equation:

$$1.5 > 19.00 - 0.406 d_B - 0.016 H - 0.553 d_T$$
$$d_T \leq 18 (\mu m)$$

wherein the reference $d_T$ ($\mu$m) designates a total thickness of the magnetic recording tape; $d_B$ ($\mu$m) designates a thickness of the base film and H designates a sum of numbers of interference rings ($H_1, H_2, H_3 \ldots$) per 1 mm$^2$.

DETAILED DESCRIPTION OF THE PREFERRED EMBODIMENTS

As a result of hard study, the inventors of the present invention have found that the occurrence of injury on the peripheral portion of the magnetic recording tape can be controlled by adjusting the correlation between the thickness of the base film, the total thickness of the magnetic tape and the surface characteristics of the base film (the height and density of the projections), and even though the magnetic recording tape has a total thickness of 18$\mu$ or less, the reproduction characteristics the magnetic recording medium on its peripheral portions will not be diminished. The reson for this is not clear, but is is clear that the stiffness of the magnetic recording tape is made high enough by the proper selection of the indicated variables as determined by the inventors.

The present invention is further illustrated. In accordance with the present invention, a magnetic recording tape which has a satisfactory mechanical stiffness of the peripheral portions of the magnetic recording tape even though the total thickness is 18$\mu$ or less and which does not exhibit fluctuations or reductions in the output of the audio signals recorded on the peripheral portions of the tape can be provided by adjusting the index y to 1.5 or less:

$$y = 19.00 - 0.406 d_B - 0.016 H - 0.553 d_T$$

In the equation $d_T$ designates the total thickness of the magnetic tape, $d_B$ designates the total thickness of the polyethyleneterephthalate base film; and H designates the index for the height and density of projections on the surface of the base film.

The invention will be further illustrated by certain examples which are provided herein for purposes of illustration only.

EXAMPLE

Polyethyleneterephthalate films having a thickness of 6.58 to 14.70$\mu$ were used as sample base films and the surface of each sample treated and a magnetic layer having a thickness within the range of 1.56 to 6.03$\mu$ was formed on each base film.

Each magnetic layer was formed by using the magnetic composition having the following composition:

| | |
|---|---|
| Co doped $\gamma$-Fe$_2$O$_3$ | 70 parts |
| Binder | 30 parts |
| The binder had the following components. | |
| Polyurethane prepolymer | 5 parts |
| Nitrocellulose | 3.5 parts |
| PVC | 1.5 parts |
| Methyl ethyl ketone | 90 parts |
| Hardner, isocyanate compounds (Desmodule manufactured by Bayer) | 15 parts |

The resulting magnetic recording tape was installed in the VHS type cartridge and certain audio signals were recorded and reproduced to measure the reduction of the output. The results are shown in Table 1.

The following methods were used in determining the values shown in Table 1.

The thicknesses $d_T$, $d_B$ and $d_g$ (the thickness of the magnetic layer) were measured by an electronic micrometer (K313A, K4023B STANDARD) manufactured by Anritsu Electric Co., Ltd. As for $d_B$ and $d_T$, the average of the values was obtained as measured at 10 points along the length of the magnetic tape. As for $d_g$, it is a calculated value obtained by subtracting the measured values $d_T$ and $d_B$. Secondly, the density H means the height and density of the projections on the base film (the number of projections observed in 1 sq. mm of the surface of the base film). The measurement of height was made with a multi-reflexing interference microscope using visible single color light (NIKON BFM made by Nippon Kogaku Co., Ltd.). The interference pattern obtained from the surface of the base film and the flat reflecting surface of the interference meter was taken as a photograph magnified by 240 times, the microscope being adjusted so that the interference pattern rings would appear in 6 to 7 rings in one photograph. Moreover, the measurement was made after coating the surface of the base film with a this aluminum layer by metal vapor deposition. Many rings were observed corresponding to the projections, and H was calculated by taking many portions having each size of 1.28 sq. mm at random and counting the number of the rings and converting the said number into the number per 1 sq. mm due to the narrowness of the visual field and was given as a sum of all of the numbers of various rings ($H_1$, $H_2$, $H_3$ . . . ), $H_1$ having a single ring of more than 2 mm in parallel with the interference fringe, $H_2$ simply having a twofold ring, $H_3$ having a threefold ring and $H_4$ having a fourfold ring. The relationship of the rings to the height of the projections are as follows.

$H_1$ 0.27 to 0.53 μm,
$H_2$ 0.54 to 0.80 μm,
$H_3$ 0.81 to 1.07 μm,
$H_4$ 1.07 to 1.34 μm.

The measurement of the reduction of audio output was made as follows. By using a VHS system VTR on the market audio input AGC is kept OFF, and the signals at the optimum bias of each magnetic recording tape and at the optimum input level were recorded. The recorded signal was a sine wave of 7 KHz. The optimum input level was recorded as the sine wave of 1 KHz, the level of input being lower by 10 $d_B$ than the input level causing bias of 3% on reproduction. The recorded magnetic recording tape is applied to the loading-injury-checking VTR and play-stop-quick sending-play operations were repeated 10 times once in about every 30 cm. Then the said tape was rewound, and reproduced by the recorded VTR and the reduction of audio output is expressed by $d_B$. The reduced output portion appears in the output wave corresponding to the above-mentioned 10-time stopped portion. The average reduced output value on these 10 portions was calculated. If the said value exceeds 1.5 $d_B$, the resulting sound is unpleasant to the ear. The judgement was made taking this value as a standard.

TABLE 1

| Sample No. | $d_B$ | $d_g$ | H | $d_T$ | Audio output lowering ($d_B$) |
|---|---|---|---|---|---|
| 1 | 7.11 | 6.03 | 250 | 13.14 | 4.10 |
| 2 | 11.62 | 4.44 | 250 | 16.06 | 0.19 |
| 3 | 14.60 | 1.29 | 250 | 15.89 | 0.26 |
| 4 | 6.58 | 4.12 | 230 | 10.70 | 7.43 |
| 5 | 7.25 | 4.00 | 250 | 11.25 | 5.96 |
| 6 | 14.63 | 4.58 | 230 | 19.21 | 0.22 |
| 7 | 14.22 | 1.86 | 222 | 16.08 | 0.19 |
| 8 | 14.70 | 1.56 | 100 | 16.26 | 1.49 |
| 9 | 11.85 | 1.70 | 220 | 13.55 | 4.34 |
| 10 | 11.03 | 2.11 | 370 | 13.14 | 0.92 |

As understood from the above-mentioned table, the reduction of output is greatly influenced by the combination of $d_T$, $d_B$ and H. By using a computer, the condition under which the output reduction becomes 2 $d_B$ or less were calculated. It was found that for the above-mentioned formula, y ought to be a value of 2 or less. Among the sample numbers in the Table 1, only samples 2, 3, 6, 7, 8 and 10 satisfy the above-mentioned condition, the rest not being able to satisfy the said condition.

As can be seen from the above, an excellent magnetic recording tape having the total thickness of 18μ or less is provided in accordance with the present invention.

We claim:

1. A magnetic recording tape, which comprises:
a polyethylene terephthalate base film coated with magnetic particles in a binder in which said base film has an index given by the expression $$1.5 > 19.00 - 0.406 d_B - 0.016 H - 0.553 d_T$$
$$d_T \leq 18 (\mu m)$$

wherein $d_T(\mu m)$ designates the total thickness of the magnetic recording tape, $d_B(\mu m)$ designates the thickness of the base film and H designates the sum of numbers of interference rings ($H_1$, $H_2$, $H_3$ . . . ) per 1 mm$^2$ on the surface of the base film.

2. The magnetic recording tape of claim 1, wherein the thickness of the magnetic layer ranges from 1.56 to 6.03 μm.

3. The magnetic recording tape of claim 1, wherein the magnetic particles of said magnetic layer are Co doped $\gamma$-$Fe_2O_3$.

4. The magnetic recording tape of claim 1, wherein said polyethyleneterephthalate base film has a surface roughness characterized by the values for $H_1$ to $H_4$ as follows:

$H_1$ 0.27 to 0.53 μm
$H_2$ 0.54 to 0.80 μm
$H_3$ 0.81 to 1.07 μm
$H_4$ 1.07 to 1.34 μm

5. The magnetic recording tape of claim 1, which has an output reduction of no more than 2.

* * * * *